(12) United States Patent
Miao et al.

(10) Patent No.: US 9,149,859 B2
(45) Date of Patent: Oct. 6, 2015

(54) FORGING METHOD, MOLDING DEVICE FOR FORGINGS, AND TRIPOD UNIFORM MOTION UNIVERSAL JOINT

(75) Inventors: Jiahua Miao, Iwata-shi (CN); Akira Sera, Iwata (JP); Shunsuke Makino, Iwata (JP)

(73) Assignee: NTN CORPORATION, Osaka (JP)

( * ) Notice: Subject to any disclaimer, the term of this patent is extended or adjusted under 35 U.S.C. 154(b) by 1149 days.

(21) Appl. No.: 13/129,650

(22) PCT Filed: Nov. 30, 2009

(86) PCT No.: PCT/JP2009/070105
§ 371 (c)(1),
(2), (4) Date: May 17, 2011

(87) PCT Pub. No.: WO2010/073878
PCT Pub. Date: Jul. 1, 2010

(65) Prior Publication Data
US 2011/0224005 A1    Sep. 15, 2011

(30) Foreign Application Priority Data

Dec. 22, 2008   (JP) .................................. 2008-325955

(51) Int. Cl.
*B21J 5/02* (2006.01)
*B21K 1/76* (2006.01)
(Continued)

(52) U.S. Cl.
CPC .. *B21J 5/025* (2013.01); *B21J 5/02* (2013.01); *B21J 9/02* (2013.01); *B21K 1/762* (2013.01); *F16D 3/2055* (2013.01); *F16D 3/34* (2013.01); *F16D 2250/00* (2013.01)

(58) Field of Classification Search
USPC ............... 72/353, 353.2, 353.4, 353.6, 354.2, 72/355.2, 355.6, 357–360, 461, 470, 474; 29/898.045
See application file for complete search history.

(56) References Cited

U.S. PATENT DOCUMENTS 4,177,665 A * 12/1979 Schurmann ..................... 72/359
4,918,970 A *  4/1990 Ishinaga ..................... 72/355.6
(Continued)

FOREIGN PATENT DOCUMENTS

EP       2 141 375        1/2010
JP    2003-343592       12/2003
(Continued)

OTHER PUBLICATIONS

International Search Report issued Jan. 12, 2010 in International (PCT) Application No. PCT/JP2009/070105.
(Continued)

*Primary Examiner* — Shelley Self
*Assistant Examiner* — Pradeep C Battula
(74) *Attorney, Agent, or Firm* — Wenderoth, Lind & Ponack, L.L.P.

(57) ABSTRACT

After molding a preliminarily molded product as a material, the preliminarily molded product is put into a full-enclosed forging die so that a product is molded with the full-enclosed forging die. A shear-drop suppressing portion for suppressing thickness reduction on a boss-portion side of an outer peripheral portion of a leading end surface of each of shaft portions of the product is formed on the preliminary leading-end surface configuring a leading end surface of each of the shaft portions of the product in the preliminarily molded product. When the preliminarily molded product is put into the full-enclosed forging die and the product is to be molded, a relief portion is formed between the leading end surface of each of the shaft portions to be molded and a cavity of the full-enclosed forging die.

1 Claim, 11 Drawing Sheets

(51) Int. Cl.
 *F16D 3/205* (2006.01)
 *B21J 9/02* (2006.01)
 *F16D 3/34* (2006.01)

(56) References Cited

U.S. PATENT DOCUMENTS

| | | | | |
|---|---|---|---|---|
| 6,044,684 | A | * | 4/2000 | Ohama et al. ............... 72/354.2 |
| 7,690,236 | B2 | * | 4/2010 | Otaki ............................ 72/355.6 |
| 7,900,493 | B2 | * | 3/2011 | Jiahua et al. ................ 72/353.2 |
| 2005/0016246 | A1 | * | 1/2005 | Yamanaka et al. ........... 72/355.6 |
| 2008/0184765 | A1 | | 8/2008 | Jiahua et al. |

FOREIGN PATENT DOCUMENTS

| | | |
|---|---|---|
| JP | 2006-183725 | 7/2006 |
| JP | 2008-188617 | 8/2008 |
| JP | 2008-240825 | 10/2008 |

OTHER PUBLICATIONS

Chinese Office Action issued Sep. 30, 2013 in corresponding Chinese Patent Application No. 200980151520.X with English translation.
International Preliminary Report on Patentability and Written Opinion of the International Searching Authority issued Jul. 14, 2011 in International (PCT) Application No. PCT/JP2009/070105.

* cited by examiner

Prior Art

Prior Art

FORGING METHOD, MOLDING DEVICE FOR FORGINGS, AND TRIPOD UNIFORM MOTION UNIVERSAL JOINT

TECHNICAL FIELD

The present invention relates to a forging method, a forged-product molding apparatus, and a tripod type constant velocity universal joint.

BACKGROUND ART

In order to form, through full-enclosed forging, a product including a boss portion radially provided with shaft portions, such as a trunnion (tripod member) for constant velocity universal joints and a cross spider for universal joints, a full-enclosed forging die is used.

Figure 9:
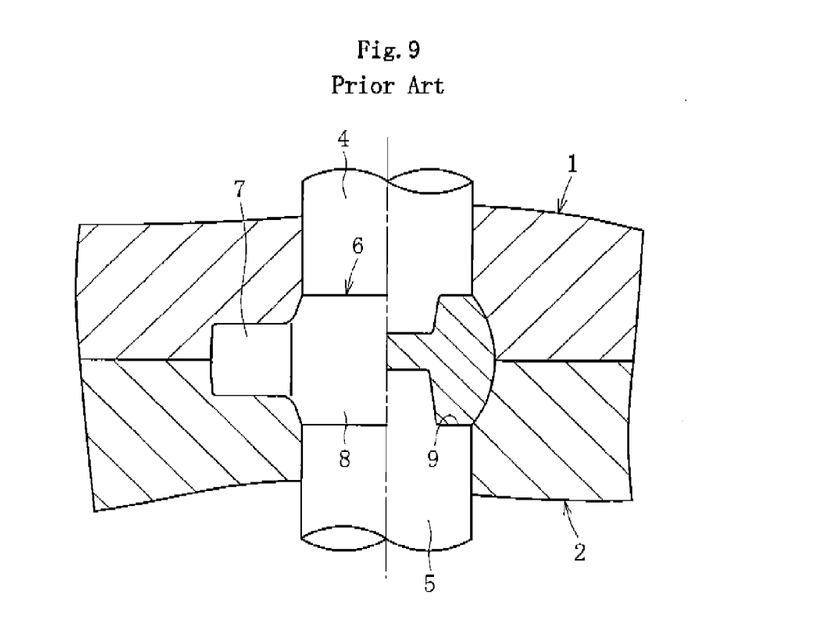
FIG. 9 A sectional view of a conventional full-enclosed forging die.
Figure 10A:
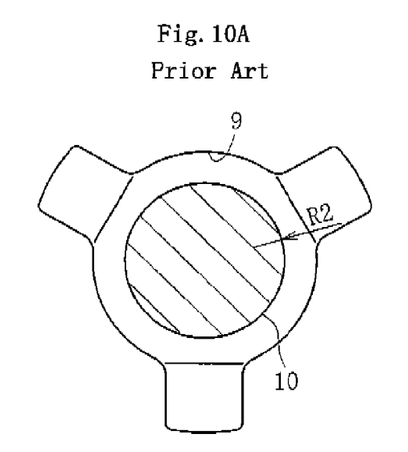
FIG. 10A A processing diagram illustrating a conventional forging method.
Figure 10B:
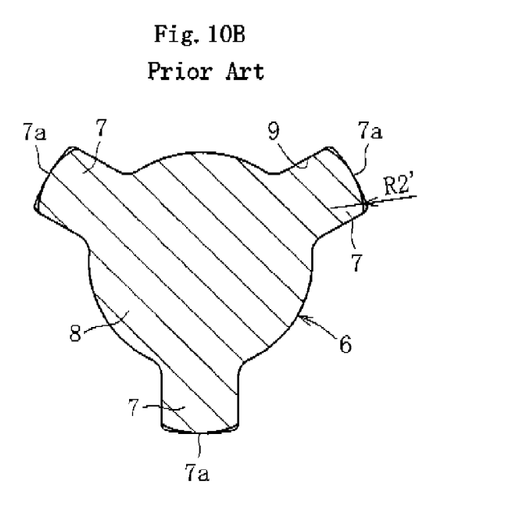
FIG. 10B A processing diagram illustrating the conventional forging method.

As illustrated in FIG. 9, the full-enclosed forging die includes openable/closable dies 1 and 2 and punches 4 and 5 arranged so as to be operable on a central axis of the dies 1 and 2. Specifically, through pressing with the punches 4 and 5 under a state in which the dies 1 and 2 are closed, a cavity 9 is formed, which corresponds to shapes of shaft portions 7 and a boss portion 8 of a product 6. Thus, as illustrated in FIG. 10A, a billet (material) 10 (refer to FIG. 10A) is put into the cavity 9, and then clamping is performed. After that, the billet 10 is pressed with the punches 4 and 5 so as to be plastically deformed. As a result, as illustrated in FIG. 10B, the product 6 can be formed, which is provided with the boss portion 8 and the shaft portions 7.

Specifically, through forging of the billet 10 put into the dies 1 and 2, the billet 10 having a columnar shape and a curvature radius R2 as illustrated in FIG. 10A, the product 6 can be formed, which includes the shaft portions 7 each having a leading end surface 7a with a curvature radius R2' larger than R2.

By the way, in the full-enclosed forging die, processing load sharply increases in a sealed state, which may lead to a risk of breakage of the die and shortening of a life thereof. As a countermeasure, conventionally, there has been proposed to set a shaft-molding portion to be longer than a required shaft-portion length so that a relief portion is provided at a shaft-leading-end portion (Patent Literature 1).

However, in the conventional die including the shaft-molding portion in which the relief portion is formed, a material obtained through extrusion of the billet pressed with the punches into the shaft portion is liable to be fluidized on a central portion at the leading end surface of the shaft portion and is less liable to be fluidized on a peripheral portion thereat. As a result, a shaft portion is formed, which has a leading end surface with a curvature radius smaller than a curvature radius of a leading end surface of a regular shaft portion. In this manner, in the conventional die provided with the relief portion formed at a shaft molding portion, there occurs "shear drop" which represents retraction of an outer peripheral side toward a proximal end side in a shaft-portion axial direction relative to the leading end surface of the regular shaft portion.

Thus, in order to secure a length of the shaft portion while forming the shaft portion with high accuracy with the die, an extra material is required by an amount of the "shear drop". By the way, products molded by forging with the full-enclosed forging die constitute inner joint members for constant velocity universal joints and universal joints. Thus, in order to compactify and weight-reduce the constant velocity universal joints and the universal joints using the products, it is necessary to remove a leading end of the shaft portion by a machining process.

Further, in order to prolong lives during use of the constant velocity universal joints and the universal joints in which the products are incorporated, and to suppress vibration and noise, it is required to enhance strength and hardness of the products by heat treatment, and to form shaft-portion outer peripheral surfaces of the products with accuracy higher than that in a forging process. Thus, it is necessary to finish the products with high accuracy by a machining process after the heat treatment. In anticipation of the machining process after the heat treatment, in some cases, the shaft leading end is removed by a machining process prior to the heat treatment so that an intersection surface of a removal surface and the shaft-portion outer peripheral surface is used as a reference plane for phase determination at the time of a high-accuracy machining process on the shaft-portion outer peripheral surface. Therefore, it is necessary to form the intersection surface with high accuracy.

Under the circumstance, conventionally, there has been proposed to perform, prior to a step of molding a product shape (referred to as mid-molding), a preliminary molding step of increasing a curvature radius of a part corresponding to the shaft portion at the time of mid-molding. With this, at the time of molding of the shaft portion in mid-molding, shear drop can be reduced even under a state in which the central portion of the shaft portion is liable to be fluidized in comparison with the peripheral portion thereof and in which the material does not comes into contact with the relief portion. As a result, the constant velocity universal joints and the universal joints can be compactified and weight-reduced (Patent Literature 2).

CITATION LIST

Patent Literature

[PTL 1] JP 2003-343592 A
[PTL 2] JP 2008-188617 A

SUMMARY OF INVENTION

Technical Problems

As described above, in the full-enclosed forging die designed to perform the preliminary molding step, the above-mentioned "shear drop" can be reduced. However, when weights of raw materials to be put-into vary from each other, an excessively-heavy raw material is mixed in some cases. In such a case, the leading end surface (shaft leading end) of the shaft portion comes into contact with the dies so as to cause a sealed state. As a result, processing load sharply increases, which may lead to such a risk that a life of the die is shortened.

In order to solve the above-mentioned problems, the present invention has been made to provide a forging method, a forged-product molding apparatus, and a tripod type constant velocity universal joint which contribute to reduction of shear drop and avoidance of an increase in processing load generated through contact of the leading end surface (shaft leading end) of the shaft portion and the dies even when an excessively-heavy raw material is mixed so that a life of the die can be prolonged.

Solution to Problems

A forging method according to the present invention, in which a full-enclosed forging die including openable/closable dies and punches for pressing a material between the openable/closable dies is used so that a product including a boss portion and shaft portions protruded radially from the boss portion is molded, includes: putting, after molding a product-to-be-preliminarily-molded to form a preliminarily molded product as the material, the preliminarily molded product into the full-enclosed forging die so that the product is molded with the full-enclosed forging die; forming, on a preliminary leading-end surface to be formed as a leading end surface of each of the shaft portions of the product formed of the preliminarily molded product, a shear-drop suppressing portion for suppressing thickness reduction on a boss-portion side of an outer peripheral portion of the leading end surface of each of the shaft portions of the product; and forming, at a time of putting the preliminarily molded product into the full-enclosed forging die so as to mold the product, a relief portion between the leading end surface of each of the shaft portions to be formed and a cavity of the full-enclosed forging die.

According to the forging method of the present invention, the shear-drop suppressing portion is formed on the outer peripheral portion of the leading end surface of each of the shaft portions of the product formed of the preliminarily molded product put in the full-enclosed forging die. Thus, at the time of molding of the shaft portions with the full-enclosed forging die, shear drop can be reduced even under a state in which a central portion of each of the shaft portions is liable to be fluidized in comparison with a peripheral portion thereof.

Further, the relief portion is formed between the leading end surface of each of the shaft portions to be formed and the cavity of the full-enclosed forging die. Thus, even when an excessively-heavy raw material is mixed, a gap can be sufficiently secured between the shaft leading end and the dies.

The shear-drop suppressing portion may be formed with the preliminary leading-end surface of the preliminarily molded product being formed as a flat-surface portion, or with a curvature center of the preliminary leading-end surface of the preliminarily molded product being arranged on a radially outer side relative to the preliminary leading-end surface so that a circumferential end portion of the preliminary leading-end surface of the preliminarily molded product has a swelling shape.

The preliminarily molded product is, for example, a hexagonal columnar body having six surfaces as an outer peripheral surface thereof, in which, of the six surfaces, surfaces arranged at pitches of 120° each constitute the preliminary leading-end surface, and other surfaces of the six surfaces constitute preliminary radially-outer surfaces each forming a boss-portion radially-outer surface between the shaft portions. There is a case where the product is a tripod member for a tripod type constant velocity universal joint.

The forged-product molding apparatus according to the present invention includes: a full-enclosed forging die for product molding, which includes openable/closable dies and punches for pressing a material between the openable/closable dies, which is capable of molding a product including a boss portion and shaft portions protruded radially from the boss portion, and in which a relief portion is formed between a product-molding cavity of the full-enclosed forging die and each of the shaft portions at a time of molding; and a preliminarily-molded-product die for molding a product-to-be-preliminarily-molded as the material including a shear-drop suppressing portion for suppressing thickness reduction toward a boss-portion side of an outer peripheral portion of a leading end surface of each of the shaft portions of the product, the shear-drop suppressing portion being formed on a preliminary leading-end surface to be formed as the leading end surface of each of the shaft portions of the product.

According to the forged-product molding apparatus of the present invention, the shear-drop suppressing portion is formed on the outer peripheral portion of the leading end surface of each of the shaft portions of the product formed of the preliminarily molded product put in the full-enclosed forging die. Thus, at the time of molding of the shaft portions with the full-enclosed forging die, shear drop can be reduced even under the state in which the central portion of each of the shaft portions is liable to be fluidized in comparison with the peripheral portion thereof. Further, the relief portion is formed between the leading end surface of each of the shaft portions to be formed and the cavity of the full-enclosed forging die. Thus, even when an excessively-heavy raw material is mixed, the gap can be sufficiently secured between the shaft leading end and the dies. That is, according to the forged-product molding apparatus of the present invention, the above-mentioned forging method of the present invention can be stably performed.

A regulating portion with which the leading-end outer peripheral portion of each of the shaft portions comes into contact at the time of molding may be provided in the product-molding cavity of the full-enclosed forging die. When the regulating portion is provided in this manner, the material comes into contact with the contact portion at the time of pressing with the punches. As a result, a shape of a part or an entire of the outer periphery of each of the shaft leading ends is secured. The secured part can be used as a reference plane for phase determination at the time of a high-accuracy machining process on the shaft-portion outer peripheral surface.

In a preliminarily-molded-product-formation cavity of the preliminarily-molded-product die, a flat-surface portion for molding of the shear-drop suppressing portion may be provided or a circular-arc surface portion for molding of the shear-drop suppressing portion may be provided, the circular-arc surface portion being convex to a preliminarily-molded-product-formation cavity side.

A tripod type constant velocity universal joint according to the present invention includes a tripod member molded with the forged-product molding apparatus described above.

Advantageous Effects of Invention

In the present invention, "shear drop" at each of the shaft portions can be reduced, and the constant velocity universal joints and the universal joints using the forged products can be compactified and weight-reduced. In addition, even when an excessively-heavy raw material is mixed, the gap can be sufficiently secured between the shaft leading end (shaft-portion leading-end surface) and the dies, and an increase in processing load generated through contact of the shaft leading end and the dies can be avoided. As a result, the life of the full-enclosed forging die can be prolonged.

The shear-drop suppressing portion can be easily formed, for example, with the preliminary leading-end surface of the preliminarily molded product being formed as a flat-surface portion, or with the outer peripheral side of the preliminary leading-end surface of the preliminarily molded product being formed in a swelling shape. Further, for example, when being constituted by a hexagonal columnar body having six surfaces as an outer peripheral surface, the preliminary molded product can be stably molded as a tripod member of a tripod type constant velocity universal joint as a product.

When the regulating portion is provided with which the leading-end outer peripheral portion of each of the shaft portions comes into contact at the time of molding, each of the parts secured by the dies can be used as the reference plane for phase determination at the time of a high-accuracy machining process. Thus, it is unnecessary to remove the shaft leading end by a machining process prior to heat treatment so that the reference plane (reference portion) is formed. As a result, material cost and machining-process cost can be reduced.

The tripod type constant velocity universal joint of the present invention can be provided with the tripod member molded with the forged-product molding apparatus, and hence can be compactified and weight-reduced.

BRIEF DESCRIPTION OF DRAWINGS

FIG. 1A(i) A sectional view of a full-enclosed forging die of a full-enclosed forging apparatus that uses a preliminary molded product molded by a preliminary-molding die, illustrating an embodiment of the present invention, and is in a die-open state.

FIG. 1B(i) A sectional view of a full-enclosed forging die of a full-enclosed forging apparatus that uses a preliminarily molded product molded by a conventional preliminarily-molding die, and is in a die-open state.

FIG. 1A(ii) A sectional view of the full-enclosed forging die of the full-enclosed forging apparatus that uses the preliminary molded product molded by the preliminary-molding die, illustrating an embodiment of the present invention, and is in a die-closed state.

FIG. 1B(ii) A sectional view of the full-enclosed forging die of the full-enclosed forging apparatus that uses the preliminary molded product molded by the conventional preliminary-molding die, and is in a die-closed state.

FIG. 2A(i) A sectional view of a part of the full-enclosed forging die in the die-open state, the part being different from that illustrated in FIG. 1A(i).

FIG. 2B(i) A sectional view of apart of the full-enclosed forging die in the die-open state, the part being different from that illustrated in FIG. 1B(i).

FIG. 2A(ii) A sectional view of a part of the full-enclosed forging die in the die-closed state, the part being different from that illustrated in FIG. 1A(ii).

FIG. 2B(ii) A sectional view of a part of the full-enclosed forging die in the die-closed state, the part being different from that illustrated in FIG. 1B(ii).

DESCRIPTION OF EMBODIMENTS

In the following, description is made of an embodiment of the present invention with reference to FIGS. 1 to 7.

Figure 1A:
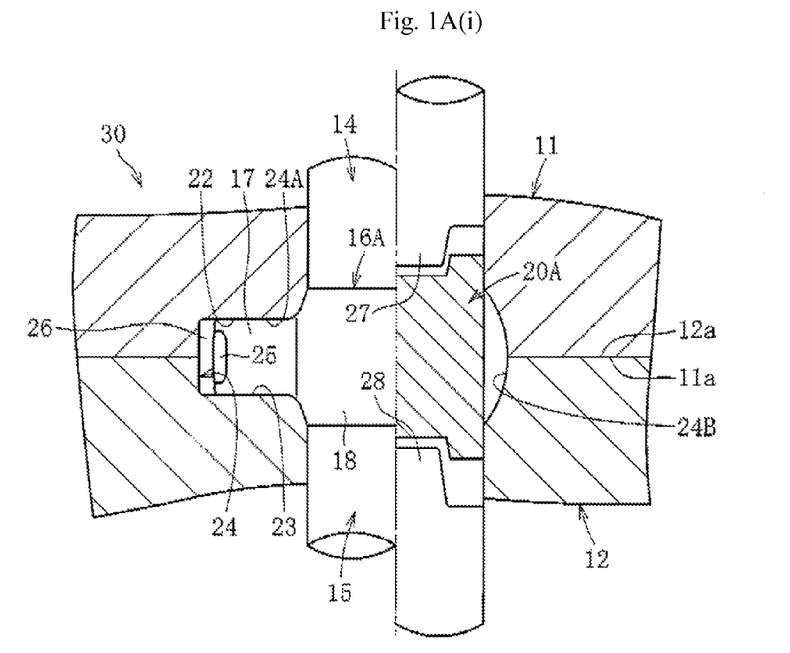
Figure 1B:
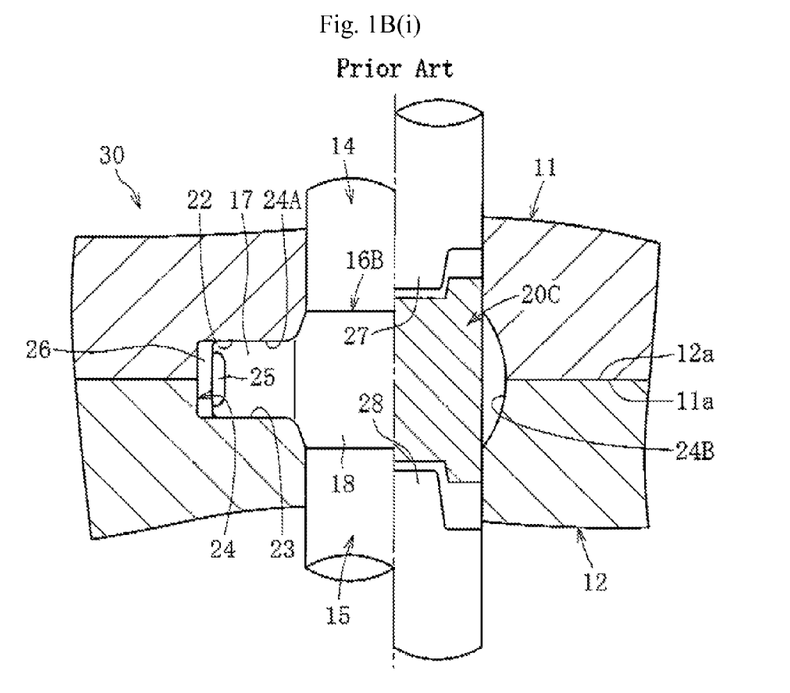
Figure 2A:
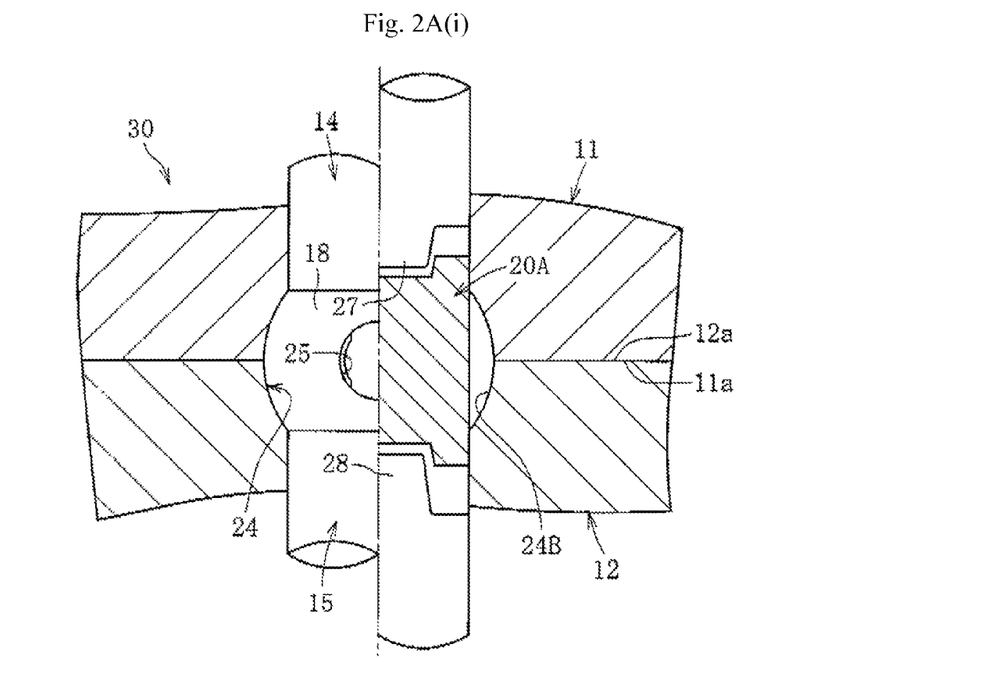
Figure 2B:
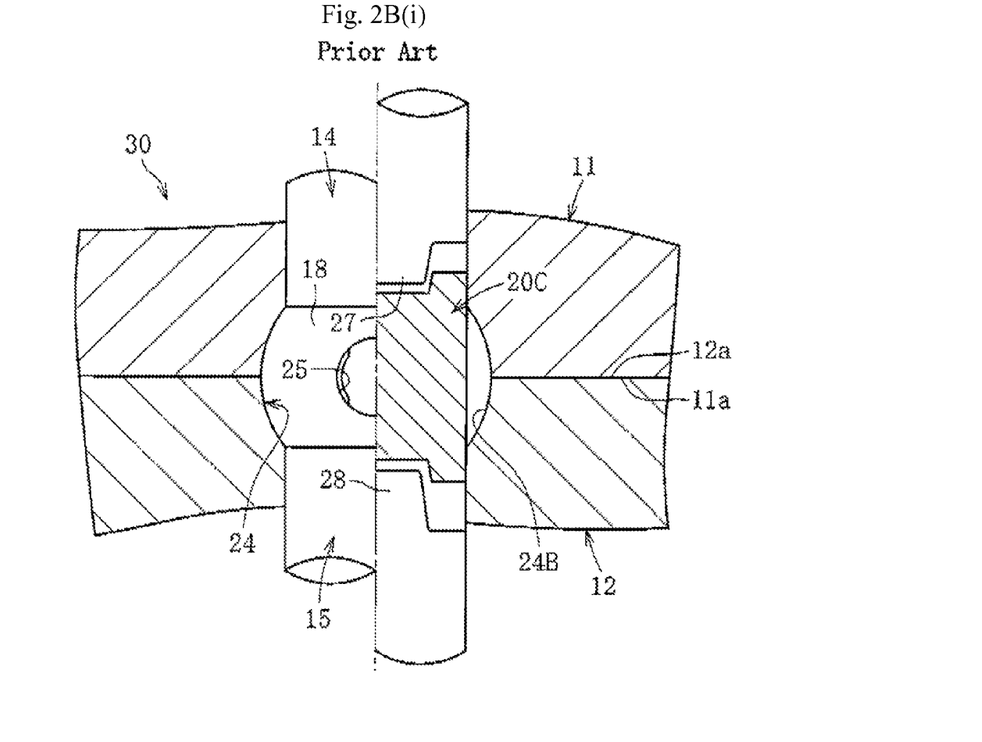
Figure 3A:
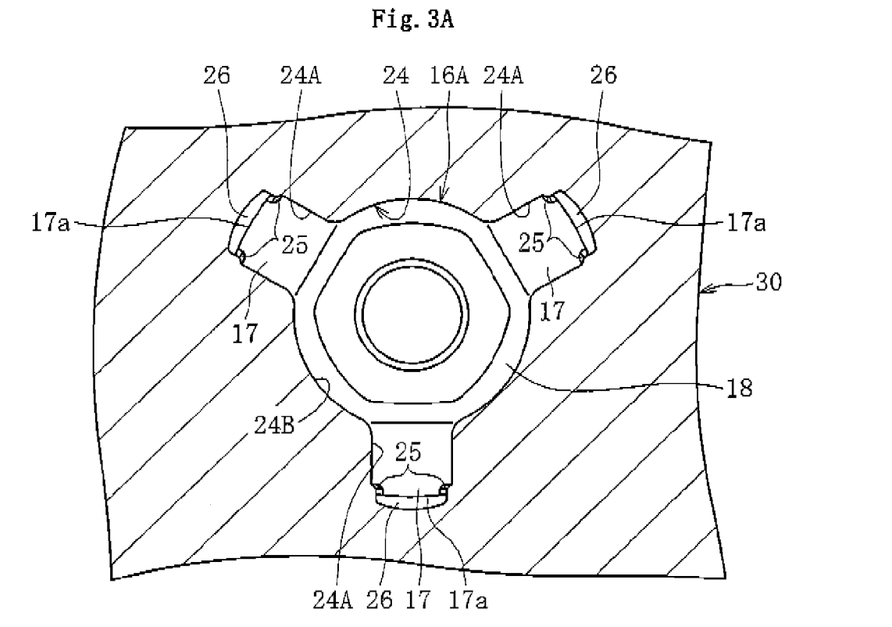
FIG. 3A A sectional plan view of the full-enclosed forging die illustrated in FIG. 1A(ii).
Figure 3B:
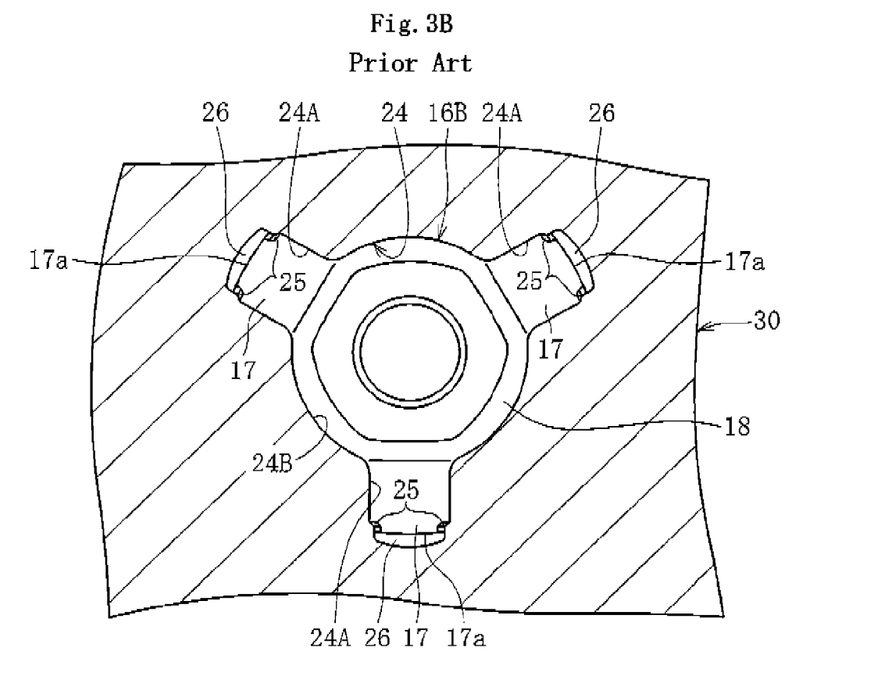
FIG. 3B A sectional plan view of the full-enclosed forging die illustrated in FIG. 1B(ii).
Figure 5A:
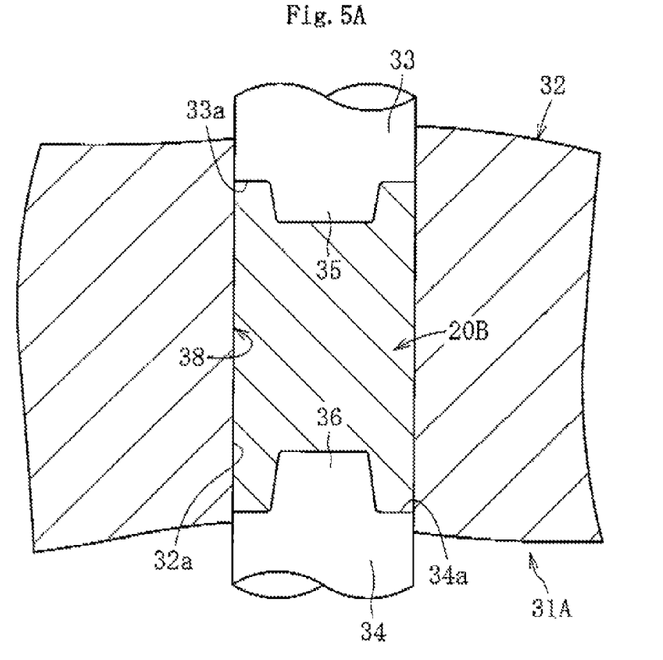
FIG. 5A A sectional view of a preliminary-molding die of the full-enclosed forging apparatus, illustrating the embodiment of the present invention.
Figure 8:
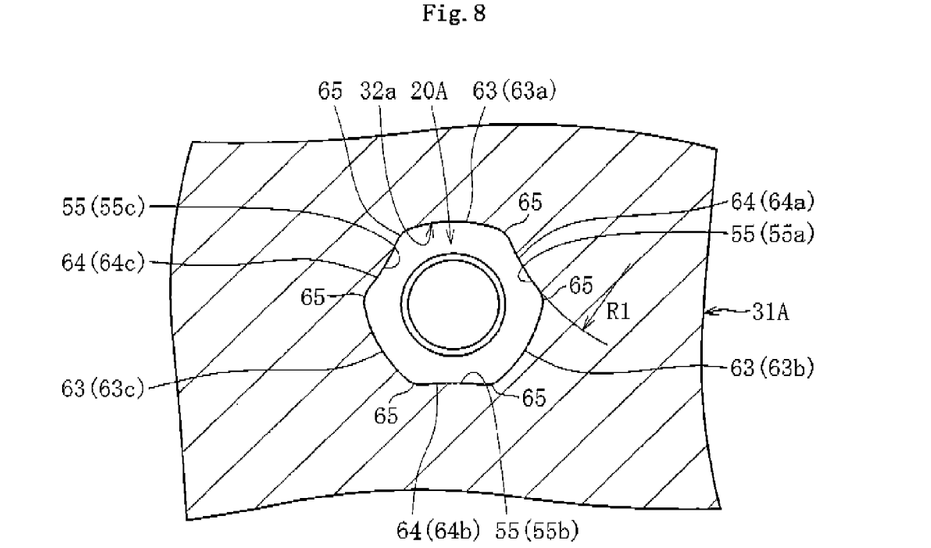
FIG. 8 A sectional plan view illustrating another embodiment of the preliminarily-molding die.

A forged-product molding apparatus according to the present invention includes a full-enclosed forging die 30 illustrated in FIGS. 1 to 3 and a preliminarily-molded-product die 31A illustrated in FIGS. 5A and 8. The full-enclosed forging die 30 includes openable and closable dies 11 and 12 and punches 14 and 15 driven along an opening/closing direction of the dies 11 and 12 so as to press a material (preliminarily molded product) in the dies 11 and 12. The full-enclosed forging die 30 in this case molds a product (for example, a tripod member for constant velocity universal joints) 16 radially provided with shaft portions 17. Note that, the tripod member as the products 16A, 16B includes a boss portion 18 and the three shaft portions 17 extending radially outward from the boss portion 18. The product 16A is a product using a preliminarily molded product 20A and molded by the forged-product molding apparatus of the present invention, that is, the preliminarily-molded-product die 31A shown in FIG. 8, and the product 16B is a product using a preliminarily molded product 20C and molded by a preliminarily-molded-product die 31B shown in FIG. 5B and FIG. 6.

Guide holes 21a and 21b are provided at respective axial portions of the dies 11 and 12, and the punches 14 and 15 are fit-inserted respectively into the guide holes 21a and 21b. Further, at an opening portion of each of the guide holes 21a and 21b on respective mating-surface-11a-and-12a sides of the dies 11 and 12, there are respectively arranged three recessed portions 22 and 23 along circumferential directions at pitches of 120° while extending in radial directions. Still further, a swelling portion 27 is provided at a central portion of a lower surface 14a of the upper punch 14, and a swelling portion 28 is provided at a central portion of an upper surface 15a of the lower punch 15.

Under a state in which the dies 11 and 12 are superimposed on each other as illustrated in FIG. 1, shaft-portion spaces 24A for forming the shaft portions 17 of each of the products 16A, 16B are formed of the recessed portions 22 and 23 facing each other. Further, a boss-portion space 24B for molding the boss portion 18 is formed of the punches 14 and 15 and the dies 11 and 12. That is, a cavity 24 for product molding is constituted by the shaft-portion spaces 24A and the boss-portion space 24B. In this case, on a radially outer side in each of the spaces 24A, contact portions 25 swell into the space 24A so as to come into contact with a leading end side of an outer peripheral surface of each of the shaft portions 17 to be formed. In addition, a gap (relief portion) 26 is provided between the contact portions 25 and a leading end surface 17a of each of the shaft portions 17 to be formed.

Figure 5B:
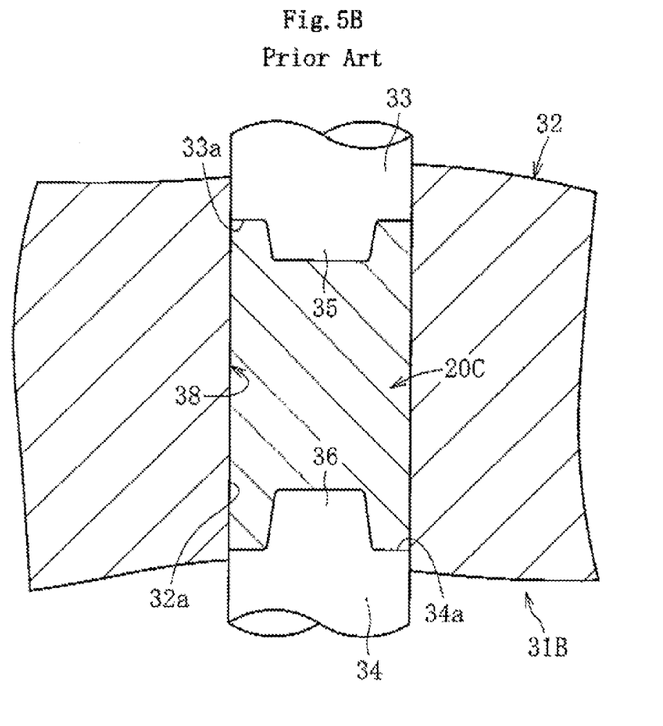
FIG. 5B A sectional view of the conventional preliminarily-molding die.

As illustrated in FIGS. 5A and 5B, the preliminarily-molded-product dies 31A, 31B each include a preliminary-molding die 32, a preliminary-molding punch 33 and an ejector 34, which are fit-inserted into a hole portion 32a of the preliminary-molding die 32.

Figure 6:
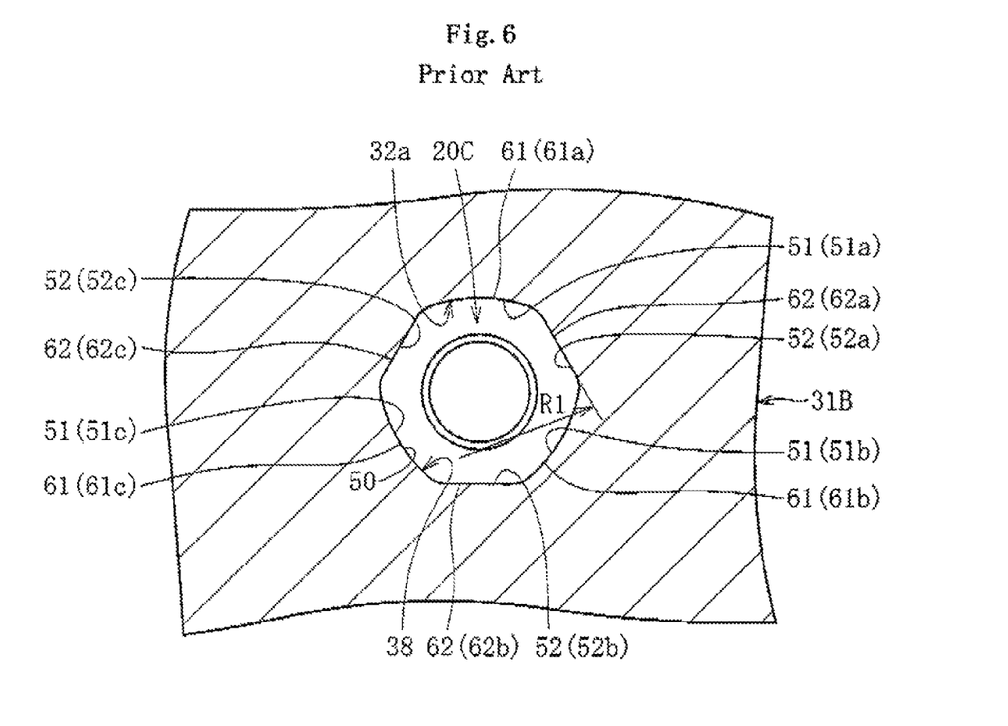
FIG. 6 A sectional plan view of the preliminary-molding die illustrated in FIG. 5B.

The hole portion 32a of the preliminary-molding die 32 is a hexagonal hole including a peripheral wall 50 having, as illustrated in FIG. 6, circular-arc surface portions 51 (51a, 51b, and 51c) and flat-surface portions 52 (52a, 52b, and 52c), which are alternately arranged. In this case, a material 20B put in the hole portion 32a of the preliminary-molding die 32 is a columnar body illustrated in FIG. 7A.

Figure 7A:
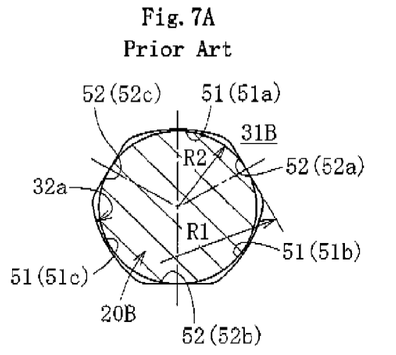
FIG. 7A A processing diagram illustrating a forging method.

As illustrated in FIG. 7A, a radius R2 of a radially outer surface of the material 20B is set to such an extent that the radially outer surface comes into contact with the flat-surface portions 52a, 52b, and 52c. That is, the flat-surface portions 52a, 52b, and 52c serve as tangents with respect to the radially outer surface. Thus, under the state in which the material 20B is put in the hole portion 32a of the preliminary-molding die 32, gaps are formed at the circular-arc surface portions 51a, 51b, and 51c, and at corner portions respectively between the flat-surface portions 52a, 52b, and 52c, and the circular-arc surface portions 51a, 51b, and 51c.

Further, as illustrated in FIG. 5, a swelling portion 35 is formed at a central portion of a lower surface 33a of the preliminary-molding punch 33, and a swelling portion 36 is formed at a central portion of an upper surface 34a of the ejector 34. The swelling portion 35 of the preliminary-molding punch 33 has the same dimension and shape as those of the swelling portion 27 of the above-mentioned upper punch 14, and the swelling portion 36 at the central portion of the ejector 34 has the same dimension and shape as those of the swelling portion 28 of the above-mentioned lower punch 15. Note that, the swelling portion 35 of the preliminary-molding punch 33 and the swelling portion 36 at the central portion of the ejector 34 may be same as or different from each other in shape, and the swelling portion 27 of the punch 14 and the swelling portion 28 of the punch 15 may be same as or different from each other in shape. Note that, a reinforcing member (reinforcing ring) (not shown) is externally fitted to the preliminary-molding die 32 by press fitting, shrink fitting, or the like.

Next, description is made of a method of forming a material (preliminarily molded product) 20C with use of the die apparatus 31B. First, as illustrated in FIG. 7A, a disk-like billet 20B is put into the die apparatus 31B in an open state. In this case, the open state represents a state in which the preliminary-molding punch 33 is raised, that is, a state in which the billet 20B can be put into the hole portion 32a of the preliminary-molding die 32. Further, although not shown, the material 20A may be finally obtained through an ironing process on an outer peripheral surface of the billet 20B. The billet 20B is inserted into the hole portion 32a with a gap ranging from φ0.005 to φ0.3. Still further, when the outer peripheral surface of the billet 20B is formed by the ironing process, it suffices to provide, on a billet-putting-in side of the preliminary-molding die 32, a guide portion which allows the billet 20B to be inserted with the above-mentioned gap.

Figure 7B:
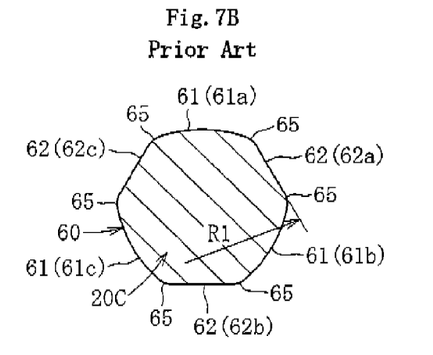
FIG. 7B A processing diagram illustrating the forging method.

In this state, the preliminary-molding punch 33 is lowered so that the billet 20B is pressed with the preliminary-molding punch 33 and the ejector 34. With this, the billet 20B is plastically deformed so as to fill a cavity 38 constituted by the hole portion 32a of the preliminary-molding die 32, the preliminary-molding punch 33, and the ejector 34. As a result, as illustrated in FIG. 7B, the material 20C is formed. Specifically, the material 20C can be formed, which has a hexagonal surface constituted by a radially outer surface 60 including circular-arc surface portions 61 (61a, 61b, and 61c) and flat-surface portions 62 (62a, 62b, and 62c) which are alternately arranged.

Next, description is made of a forging method with use of the full-enclosed forging die illustrated in FIGS. 1 to 3. First, the upper die 11 and the lower die 12 are brought into such a die-open state as to be separated relatively to each other. In this case, as shown in FIG. 1A(i) and FIG. 2B(i) the upper punch 14 is raised and the lower punch 15 is lowered. In this state, the preliminarily molded products 20A, 20C are put into the guide hole 21b of the lower die 12 in advance. Note that, the preliminarily molded products 20A, 20C are fit-inserted into the guide holes 21a and 21b, and corresponds to a volume of a product to be formed. The preliminarily molded products 20A, 20C are formed by a preliminary molding die 31A of FIG. 8, as described later.

Figure 4A:
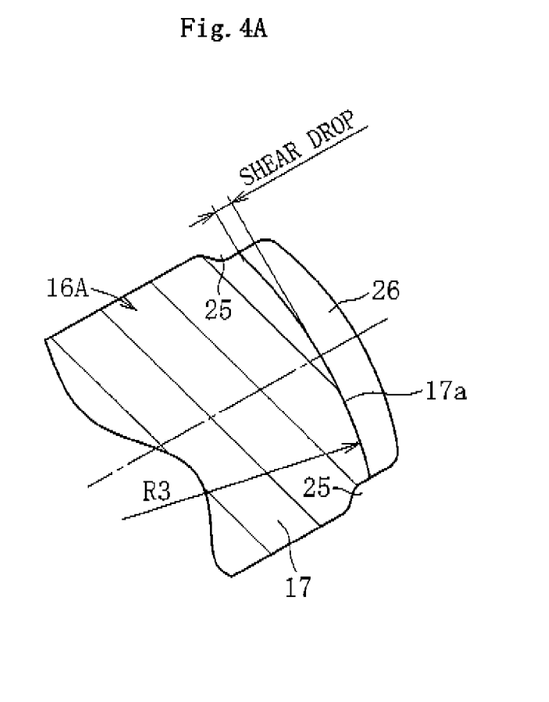
FIG. 4A A main-part enlarged sectional view of a product molded with the full-enclosed forging die illustrated in FIG. 1A(ii).
Figure 4B:
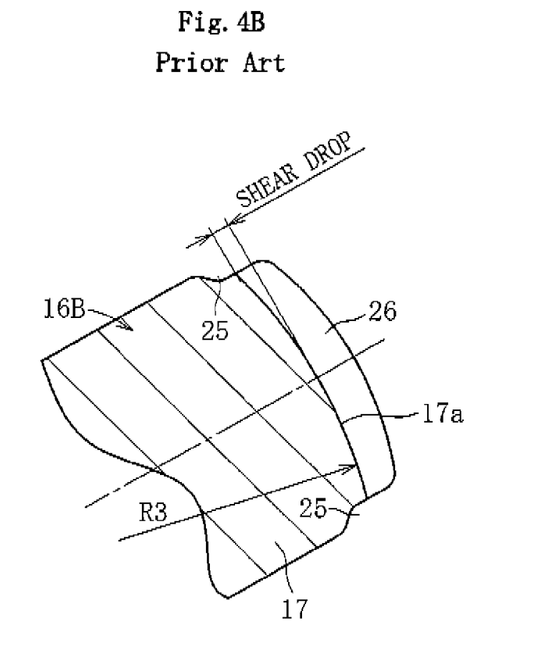
FIG. 4B A main-part enlarged sectional view of a product molded with the full-enclosed forging die illustrated in FIG. 1B(ii).

After that, clamping is performed so as to bring the upper die 11 and the lower die 12 close relatively to each other. Next, as shown in FIG. 1A(ii) and FIG. 2B(ii), the upper punch 14 is lowered, and simultaneously the lower punch 15 is raised. With this, the above-mentioned spaces 24A are formed in which the preliminarily molded product 20A is pressed from above and below so that the shaft portions 17 are formed. A preliminarily molded product 20A is fluidized in the spaces 24A so that the products 16A, 16B (tripod member) including the three shaft portions 17 radially around the boss portion 18 as illustrated in FIGS. 4A and 4B are formed.

Figures 7C, 7D:
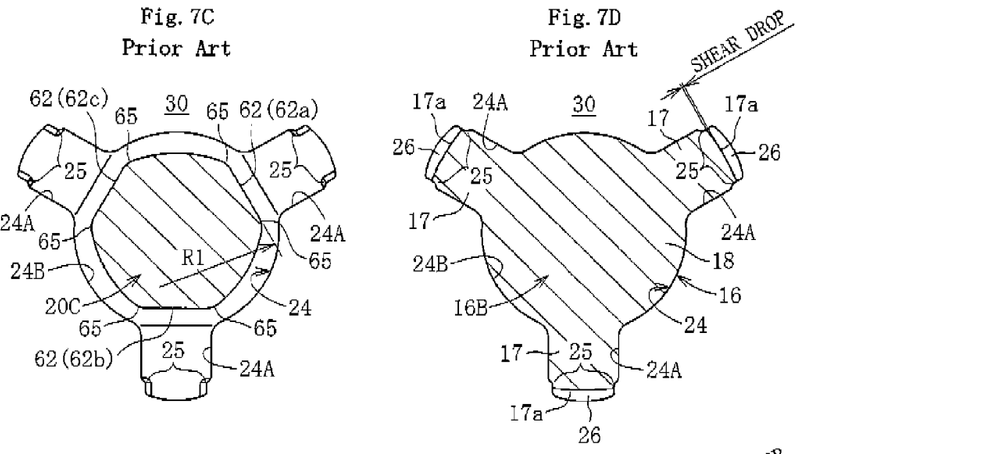
FIG. 7C A processing diagram illustrating the forging method.
FIG. 7D A processing diagram illustrating the forging method.
Figures 7E, 7F:
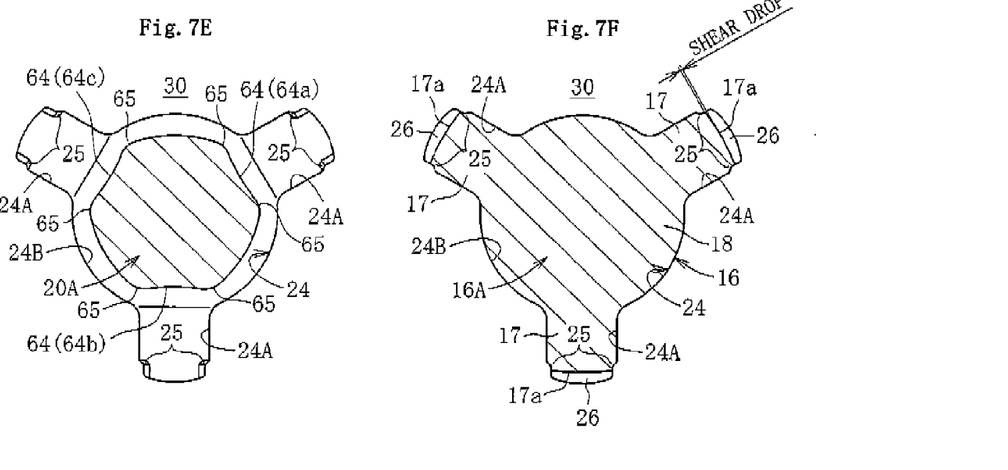
FIG. 7E A processing diagram illustrating a forging method according to the present invention.
FIG. 7F a processing diagram illustrating the forging method according to the present invention.

That is, in the forged-product molding apparatus of the present invention, first, as illustrated in FIG. 7A, the material 20B is put into the preliminary-molding dies 31A, 31B so that the preliminarily molded products 20A, 20C are molded as illustrated in FIGS. 8 and 7B. After that, the preliminarily molded products 20A, 20C are put into the full-enclosed forging dies 30, 30 as illustrated in FIGS. 7E and 7C so that the products are molded as illustrated in FIGS. 7D and 7F.

In this case, in the preliminarily molded product 20A, preliminary leading-end surfaces to be formed as the leading end surfaces 17a of the shaft portions 17 molded with the die are constituted respectively by the above-mentioned flat-surface portions 62 (62a, 62b, and 62c). In addition, the flat-surface portions 62 (62a, 62b, and 62c) extend in tangential directions of the material 20B, and hence circumferential end portions of the flat-surface portions 62 (62a, 62b, and 62c) do not recede to a radially inner side. Thus, the flat-surface portions 62 constitute shear-drop suppressing portions 65 for suppressing thickness reduction toward a boss-portion-18 side of the outer peripheral portions of the shaft portions 17. That is, when the shaft portions 17 are molded with the full-enclosed forging die 30, shear drop can be reduced even under a state in which a central portion of each of the shaft portions 17 is liable to be fluidized in comparison with a peripheral portion thereof. Thus, constant velocity universal joints and universal joints using the forged product can be compactified and weight-reduced. In addition, the relief portion is formed between the leading end surface 17a of each of the shaft portions 17 to be formed and the cavity 24 of the full-enclosed forging die 30. Thus, even when an excessively-heavy raw material is mixed, a gap can be sufficiently secured between the leading end surface (shaft leading end) 17a of each of the shaft portions 17 and the dies 11 and 12, and hence a processing-load increase caused by contact of the shaft leading end 17a and the dies 11 and 12 can be avoided. As a result, a life of the full-enclosed forging die 30 can be prolonged.

When a regulating portion 25 is provided, with which the leading-end outer peripheral portion of the shaft portion 17 comes into contact at the time of molding, parts secured by the dies 11 and 12 each can be used as a reference plane for phase determination at the time of a high-accuracy machining process. Thus, it is unnecessary to remove the shaft leading end 17a by a machining process prior to heat treatment so that the reference plane (reference portion) is formed. As a result, material cost and machining-process cost can be reduced.

The preliminarily-molding die 31A may be provided with circular-arc surface portions 55 for molding shear-drop suppressing portions convex to a cavity-38 side as illustrated in FIG. 8. In this case, the cavity 38 illustrated in FIG. 8 is obtained through replacement of the flat-surface portions 52a, 52b, and 52c in the cavity 38 of the preliminarily-molding die 31B illustrated in FIG. 6 with the circular-arc surface portions 55a, 55b, and 55c. Each of the circular-arc surface portions 55a, 55b, and 55c has a curvature center arranged on an outside of the cavity 38.

Thus, the preliminarily molded product 20A can be molded even with the preliminarily-molding die 31 having the cavity 38 described above. The preliminarily molded product 20A has a hexagonal surface constituted by the radially outer surface 60 including circular-arc surface portions (convex circular-arc surface portions) 63 (63a, 63b, and 63c) and circular-arc surface portions (concave circular-arc surface portions) 64 (64a, 64b, and 64c) which are alternately arranged. Thus, circumferential end portions of the circular-arc surface portions 64 each have a swelling shape.

Thus, when the shaft portions 17 are molded with the full-enclosed forging die 30 under a state in which each of the swelling portions of the circular-arc surface portions constitutes the shear-drop suppressing portion 65, shear drop can be reduced even under the state in which the central portion of each of the shaft portions 17 is liable to be fluidized in comparison with the peripheral portion thereof. A curvature radius R1 of each of the preliminary leading-end surfaces 55a, 55b, and 55c (64a, 64b, and 64c) may be variously set as long as each of the circumferential end portions has a swelling shape. Note that, in comparison with such a case as to be constituted by a flat-surface portion, the shear-drop suppressing portion 65 constituted by a circular-arc surface has such an advantage as to be capable of saving manufacturing cost of the punch 33 and the ejector 34.

Hereinabove, although description is made of the embodiments of the present invention, the present invention is not limited to the embodiments described above, and various modifications may be made thereto. For example, although the full-enclosed forging die 30 in the embodiments includes the plurality of contact portions 25 arranged at predetermined pitches along the circumferential direction, a single contact portion 25 may be formed over the entire periphery of each of the spaces 24A. Further, sectional shapes and sizes of the contact portions 25 may be arbitrarily changed as long as outer peripheral shapes of the shaft leading ends are secured by the dies 11 and 12 and each of the secured parts can be used as a reference plane for phase determination at the time of a high-accuracy machining process.

Further, in the full-enclosed forging die illustrated in FIG. 1, the swelling portions 27 and 28 of the upper and lower punches 14 and 15 may be different from or same as each other in shape. Still further, in the die apparatus 31 illustrated in FIGS. 5 and 6, although being same as each other, the swelling portions 35 and 36 of the preliminary-molding punch 33 and the ejector 34 may be different from each other in shape.

EXAMPLE 1

Next, comparison of a "shear drop" state was made between a case where the preliminary molding illustrated in FIGS. 7A to 7D was performed and a case where the preliminary molding was not performed. Table 1 represented below shows the results of the comparison. In Table 1, "billet curvature radius R2" represents a curvature of the material 20B prior to the preliminary molding, "pre-molding curvature radius R1" represents a curvature radius of the preliminary leading-end surfaces of the preliminarily molded material 20C, "shaft-end curvature radius R3" represents, as illustrated in FIG. 4B, a curvature radius of the leading end surface 17a of the formed shaft portion 17, and "shear drop" represents a difference between an outermost top of the leading end surface 17a of the formed shaft portion 17 and an outer edge.

In Table 1, "product of the present invention" represents a product using the preliminarily molded product 20C having the flat-surface portions 62 illustrated in FIG. 7A, "conventional product" represents a product free from being preliminarily molded, and "comparison product" represents a product having circular-arc surfaces convex on the radially outer side in place of the flat surface portions 62, the circular-arc surfaces each having a curvature radius of 47.8 mm and a shaft-end curvature radius R3 of 30.5 mm.

TABLE 1

|  | Product of the present invention | Comparison product | Conventional product |
|---|---|---|---|
|  | Pre-molding | Pre-molding | No pre-molding |
| Billet curvature radius R2 |  | 16.0 |  |
| Pre-molding curvature radius R1 | Linear | 47.8 |  |
| Shaft-end curvature radius R3 | 40.0 | 30.5 | 22.1 |
| Shear drop | 0.7 | 1.4 | 2.1 |

Table 1 shows that shear drop was successfully suppressed. Specifically, shear drop was 2.1 mm in a case where the material is inserted into a mid-molding die and processed without pre-molding, and shear drop was 0.7 mm in a case where the material is processed in the mid-molding die after being pre-molded. Note that, shear drop was 1.4 mm in the comparison example.

INDUSTRIAL APPLICABILITY

The present invention is used for a full-enclosing method of forming a product including a boss portion radially provided with shaft portions, such as a trunnion (tripod member) for constant velocity universal joints and a cross spider for universal joints.

REFERENCE SIGNS LIST 11, 12 die
16 product
17 shaft portion
17a leading end surface
18 boss portion
20A preliminarily molded product
26 relief portion
30 full-enclosed forging die
31 preliminarily-molded product die
51 (51a, 51b, 51c) circular-arc surface portion
52 (52a, 52b, 52c) flat-surface portion
55 (55a, 55b, 55c) circular-arc surface portion

61 (61a, 61b, 61c) circular-arc surface portion
62 (62a, 62b, 62c) flat-surface portion
63 (61a, 61b, 61c) circular-arc surface portion
64 (62a, 62b, 62c) flat-surface portion

The invention claimed is:

1. A forging method, in which a full-enclosed forging die comprising openable/closable dies and punches for pressing a material between the openable/closable dies is used so that a product comprising a boss portion and shaft portions protruded radially from the boss portion is molded, the product being a tripod member for a tripod type constant velocity universal joint, the forging method comprising:

putting, after molding a preliminarily molded product as the material, the preliminarily molded product into the full-enclosed forging die so that the product is molded with the full-enclosed forging die, the preliminarily molded product including a hexagonal columnar body having six surfaces as an outer peripheral surface thereof, and of the six surfaces, surfaces arranged at pitches of 120° each constitute a preliminary leading-end surface, and other surfaces of the six surfaces constitute preliminary radially-outer surfaces each forming a boss-portion radially-outer surface between the shaft portions;

forming, on a preliminary leading-end surface to be formed as a leading end surface of each of the shaft portions of the product formed of the preliminarily molded product, a shear-drop suppressing portion for suppressing thickness reduction on a boss-portion side of an outer peripheral portion of the leading end surface of each of the shaft portions of the product, each of the shear-drop suppressing portions being formed under a state in which a curvature center of the preliminary leading-end surface of the preliminarily molded product is arranged on a radially outer side relative to the preliminary leading-end surface so that a circumferential end portion of each preliminary leading-end surface of the preliminarily molded product has a concave circular arc shape; and forming, at a time of putting the preliminarily molded product into the full-enclosed forging die so as to mold the product, a relief portion between the leading end surface of each of the shaft portions to be formed and a cavity of the full-enclosed forging die.

* * * * *